United States Patent
Allen

[15] 3,640,322
[45] Feb. 8, 1972

[54] NIPPER APPARATUS FOR HARVESTING TREES

[72] Inventor: C. Andrew Allen, Savannah, Ga.
[73] Assignee: S. A. Allen, Inc.
[22] Filed: June 26, 1970
[21] Appl. No.: 50,131

[52] U.S. Cl. ............................................ 144/34 E, 144/3 D
[51] Int. Cl. ........................................................ A01g 23/02
[58] Field of Search ........... 144/2 Z, 3 D, 34 R, 34 E, 309 AC

[56] References Cited

UNITED STATES PATENTS

| | | | |
|---|---|---|---|
| 2,697,459 | 12/1954 | McFaull | 144/34 E |
| 3,533,458 | 10/1970 | McColl | 144/309 AC |
| 3,498,350 | 3/1970 | Maradyn | 144/34 R |
| 3,527,271 | 9/1970 | Chateauneuf | 144/3 D |
| 3,183,954 | 5/1965 | Larson | 144/34 E |
| 3,540,501 | 11/1970 | Jonsson | 144/34 E |

*Primary Examiner*—Gerald A. Dost
*Attorney*—Walter M. Rodgers

[57] ABSTRACT

Nipper apparatus comprises a pair of pivotally mounted blades disposed in substantially the same plane and each having a straight cutting edge, a reinforcing rib disposed about the periphery of each of the blades and each rib being arranged with its ends disposed at the ends of the cutting edge of the associated blade so as to constitute an abutment for arresting cutting movement of the blades. Gripping claws are disposed immediately above the blades and serve to envelop and grip a tree to be cut, the gripping claws and blades being operated from a common source of fluid pressure.

3 Claims, 6 Drawing Figures

PATENTED FEB 8 1972
3,640,322
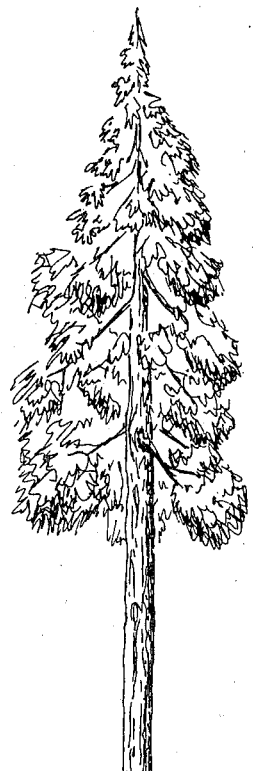
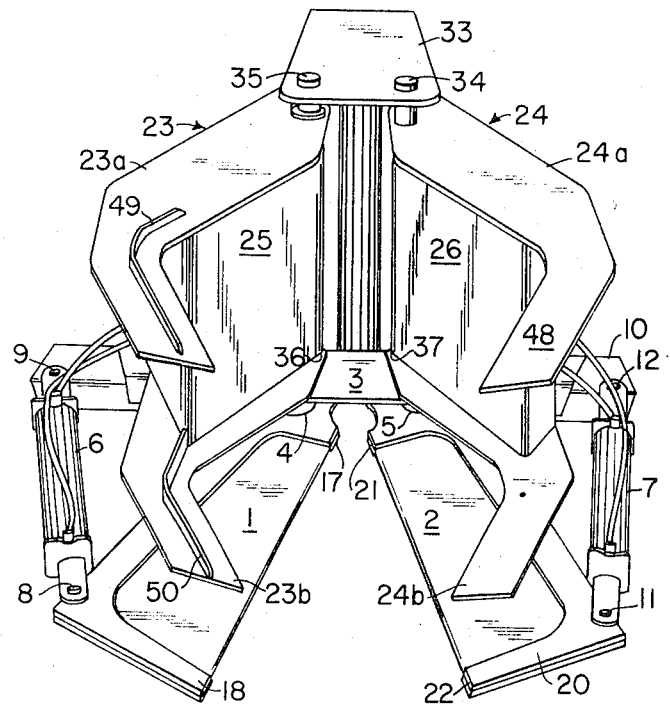
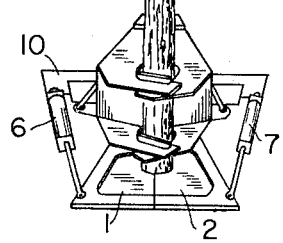
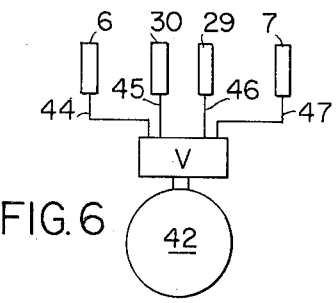
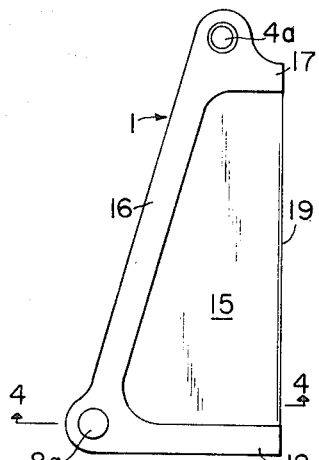
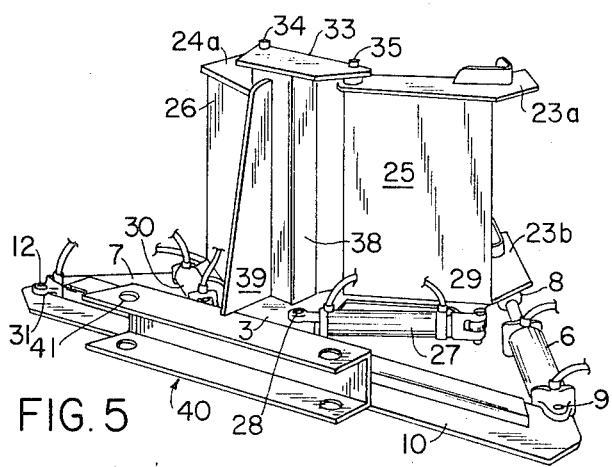
INVENTOR.
CHARLES ANDREW ALLEN
BY *Walter M. Rodgers*
ATTORNEY

NIPPER APPARATUS FOR HARVESTING TREES Known power actuated tree harvesting blades are wedge-shaped in cross section and hence require tremendous amounts of power to operate and also due to the wedge-shaped configuration of the blades tend to elevate a tree during a cutting operation. Obviously such an arrangement imposes substantial strains on the cutting apparatus and requires large heavy duty motivating means.

According to this invention, an improved cutting blade is provided with beveled surfaces along the cutting edge and a substantial portion of the blade constitutes a flat relatively thin plate reinforced about its periphery by means of a sturdy reinforcing rib whose ends form abutment edges at the ends of the straight cutting edge of the blade. According to a feature of the invention, the blade is pivotally mounted about a pivot pin disposed within an aperture formed in both the blade and the reinforcing rib. In like fashion, cutting movement is imparted to each of the blades by a mechanism which is pivotally connected to a pin disposed within an aperture formed in both the blades and the reinforcing rib.

For a better understanding of the invention reference may be had to the following detailed description taken in conjunction with the accompanying drawings in which FIG. 1 is a perspective front view of apparatus constructed according to the invention; FIG. 2 is a perspective front view similar to FIG. 1 but showing the apparatus in closed position at the completion of a tree-cutting operation, the tree being shown; FIG. 3 is a plan view of a cutting blade constructed according to the invention; FIG. 4 is a cross-sectional view taken along the line designated 4—4 in FIG. 3; FIG. 5 is a perspective view from the rear or opposite side from that depicted in FIG. 1 and FIG. 2 and in which FIG. 6 is a schematic view of the fluid actuated mechanism for imparting operating movement to the blades and grippers.

In the drawing, the numeral 1 designates one cutting blade while the numeral 2 designates a cooperating cutting blade, both blades being constructed according to the invention. Support apparatus comprises a base plate 3 to which the blades 1 and 2 are pivotally mounted by pins 4 and 5. Pin 4 is disposed within an aperture 4a formed in blade 1. Of course, blade 2 is similarly mounted by a pin extending through an aperture formed appropriately in blade 2. Blades 1 and 2 swing from the open position depicted in FIG. 1 to the closed position depicted in FIG. 2 and thus sever a tree as is obvious.

For the purpose of imparting operating movement to the blades 1 and 2, a pair of fluid motors such as the operating cylinder and piston devices designated by the numerals 6 and 7 are employed. Fluid motor 6 is pivotally connected at 8 to blade 1 and is connected at pivot pin 9 to the horizontally disposed base element 10. In like fashion fluid motor 7 is pivotally connected by way of pin 11 with blade 2 and is pivotally mounted at pivot 12 to base element 10.

Blade 1, as is apparent from FIG. 3, is provided with a pair of apertures 4a and 8a for receiving the pivot pins 4 and 8 respectively.

As is apparent from FIGS. 3 and 4, the blade 1 comprises a plate structure generally designated by the numeral 15 and a reinforcing rib designated by the numeral 16. Reinforcing rib 16 is provided with apertures which correspond to the apertures 4a and 8a and is arranged with its ends 17 and 18 disposed at the ends of the cutting edge 19 of blade 1 having beveled surfaces 19a and 19b. Since blade 2 is also provided with a reinforcing rib designated by the numeral 20 whose ends 21 and 22 constitute abutments, it is apparent that abutment end 18 engages abutment end 22 and that abutment end 17 engages abutment end 21. Thus the blades 1 and 2 swing in a common plane and, upon engagement of the abutment ends as pointed out above, cutting movement of both blades is simultaneously arrested. It is apparent that the motivating force imparted to the blades 1 and 2 by the fluid motors 6 and 7 respectively need not be accurately controlled. Stated otherwise, force applied to the blades by fluid motors 6 and 7 may cause greater travel of the blade than the other. This poses no problem, however, since the movement of both blades is arrested when their abutments engage each other. Thus, according to the invention, the apparatus is greatly simplified and its operation significantly improved due to the elimination of complicated and costly construction features.

For the purpose of enveloping the trunk of a tree to be cut, a pair of gripper claws 23 and 24 are provided. These claws constitute upper and lower gripping elements designated in the drawings at 23a, 23b, 24a and 24b. Claws 23a and 23b are interconnected by supporting and bracing structure generally designated by the numeral 25. In like fashion claws 24a and 24b are secured together by supporting and bracing structure generally designated at 26. Structures 25 and 26 could constitute a number of interconnected plates arranged to insure that claws 23a and 23b move simultaneously in unison even though motivating effort is imparted adjacent one or the other of the claws as is apparent in FIG. 5 where fluid motor 27 is interconnected by a pin 28 to base plate 3 and by a pin 29 to a point disposed adjacent the lower claw 23b.

The claw structures are pivotally mounted on base plate 3 and 33 by suitable pivot pins as is obvious from the drawing, the pivot pins for mounting to plate 33 being designated by numerals 34 and 35 and the pivotal mountings on base plate 3 being designated by the numerals 36 and 37.

The base plate 33 is disposed atop a pedestal generally designated in the drawings by the numeral 38 which is braced by a strut 39 suitably secured to pedestal 38 as by welding or otherwise.

For the purpose of rendering the apparatus readily portable, a channel structure generally designated by the numeral 40 is welded or otherwise secured to the base plate 10 and to the pedestal 38 and is provided with a plurality of holes 41 by which connection may be made to a wheeled vehicle.

Fluid under pressure is supplied to the fluid motors simultaneously according to the schematically represented system depicted in FIG. 6. For example, a pump 42 is interconnected by a conduit 43 with a schematically represented valve "V." Valve "V" controls fluid lines 44–47 inclusive which supply fluid under pressure to the fluid motors 6, 7, 29 and 30. Thus opening of valve "V" supplies fluid under pressure to all of the fluid motors simultaneously and operation of the blades 1 and 2 and of the associated grippers occurs substantially simultaneously. Of course the fact that the grippers and the blades are independent of each other allows the grippers to proceed into tree enveloping relation even though the cutting edges of the blade are not yet fully closed. The grippers are constructed in an angular fashion as is obvious particularly from FIG. 1 wherein the tip such as 48 of blade 24a is bent inwardly.

For the purpose of reinforcing the blades it may be desirable to mount a reinforcing element 49 atop a gripper blade such as 23a and a similar unit 50 may be secured atop gripper 23b.

As is apparent particularly from FIGS. 3 and 4, the major portion of the surface of blade 1, for example, is flat and extends between the beveled cutting edge 19 and the rib 16. Furthermore the cutting edge is provided with a pair of beveled surfaces indicated in FIG. 4 by the numerals 19a and 19b. Thus when a cutting operation is performed, it is not necessary to impart a substantial lifting action to the tree since the largest portion of blade 1 is flat. Advantageous cutting is achieved by the beveled surfaces 19a and 19b. Furthermore, due to the abutments between ends 18 and 22 of reinforcement ribs 16 and 20, the blades to not overlap or move into a shearing relationship with each other.

The fact that a single valve "V" is used to control the entire operation of all of the parts including the grippers and the blades, contributes considerably to the simplicity and ruggedness of the device.

The embodiments of the invention in which an inclusive privilege is claimed are described as follows:

1. Nipper apparatus comprising a pair of pivotally mounted flat blades of substantially uniform thickness throughout the major portion thereof and disposed in substantially the same plane, each of said blades having a substantially straight cutting edge, and a reinforcing rib disposed about the periphery of each of said blades and each rib having its ends disposed at the ends of the cutting edge of the associated blade and at least one end of each of said ribs constituting an abutment engageable with the corresponding end of the other of said ribs to determine the limits of travel of the cutting movement of said blades about their pivotal mountings, the pivotal mounting for each of said blades including an aperture formed in said blade and in said rib.

2. Nipper apparatus according to claim 1 wherein the cross sectional dimension of said rib in plane normal to the plane of the associated blade and in a direction parallel to the plane of said blade is greater than the cross sectional dimension thereof in said plane and in a direction normal to the plane of said blade.

3. Nipper apparatus according to the claim 2 wherein each of said blades is pivotally connected to a force applying motivating device by a pivotal connection which includes an aperture formed in said blade and in said rib and in spaced relation to the pivotal mountings for said blades respectively.

* * * * *